US010725758B2

(12) United States Patent
Fazi

(10) Patent No.: US 10,725,758 B2
(45) Date of Patent: Jul. 28, 2020

(54) TELEMATICS SYSTEM

(71) Applicant: Peter Fazi, Montreal (CA)

(72) Inventor: Peter Fazi, Montreal (CA)

(73) Assignee: Automotive Data Solutions, Inc., Montreal (CA)

( * ) Notice: Subject to any disclaimer, the term of this patent is extended or adjusted under 35 U.S.C. 154(b) by 0 days.

(21) Appl. No.: 15/058,945

(22) Filed: Mar. 2, 2016

(65) Prior Publication Data

US 2016/0274882 A1    Sep. 22, 2016

Related U.S. Application Data

(60) Provisional application No. 62/134,368, filed on Mar. 17, 2015.

(51) Int. Cl.
| | |
|---|---|
| *G06F 9/451* | (2018.01) |
| *G06F 8/61* | (2018.01) |
| *H04L 29/08* | (2006.01) |

(52) U.S. Cl.
CPC .............. *G06F 8/61* (2013.01); *G06F 9/451* (2018.02); *H04L 67/12* (2013.01); *H04L 67/34* (2013.01)

(58) Field of Classification Search
CPC . G06F 8/61; G06F 9/443; H04L 67/34; H04L 67/12
See application file for complete search history.

(56) References Cited

U.S. PATENT DOCUMENTS

| | | | | |
|---|---|---|---|---|
| 8,863,256 B1* | 10/2014 | Addepalli | ......... | H04W 72/0406 726/7 |
| 9,229,905 B1* | 1/2016 | Penilla | ..................... | G06F 17/00 |
| 2008/0150683 A1* | 6/2008 | Mikan | ................ | G07C 9/00309 340/5.31 |
| 2011/0083128 A1* | 4/2011 | Hoch | ......................... | G06F 8/61 717/174 |
| 2012/0252364 A1* | 10/2012 | Inabathuni | ............. | G08C 17/02 455/41.2 |
| 2013/0031540 A1* | 1/2013 | Throop | .................... | G06F 8/654 717/173 |
| 2013/0246135 A1* | 9/2013 | Wang | ..................... | G07C 5/008 705/14.4 |
| 2013/0281017 A1* | 10/2013 | Bondesen | ............... | H04W 4/21 455/41.1 |
| 2014/0213238 A1* | 7/2014 | Giraud | .................... | G07C 5/008 455/418 |

(Continued)

*Primary Examiner* — Wei Y Zhen
*Assistant Examiner* — Brahim Bourzik
(74) *Attorney, Agent, or Firm* — Trojan Law Offices

(57) ABSTRACT

Some embodiments of the invention concern a novel and interactive way to deliver telematics solutions by separating the delivery of the hardware and software component of a telematics device. The software telematics application is selected and delivered to the customer's telematics device by in-application purchases via the customer's mobile device. The mobile device contains a user interface that is adapted to control and configure the telematics device. The customers may upgrade their telematics applications using their mobile devices. A retailer may also request the upgrade of a customer's telematics application using the retailer's mobile device. The user interface also provide a customer profiler tool to provide individualized search results and recommend telematics applications based on the customer's profile.

7 Claims, 13 Drawing Sheets

(56) References Cited

U.S. PATENT DOCUMENTS

| | | | | |
|---|---|---|---|---|
| 2015/0230044 A1* | 8/2015 | Paun | ............ | G06F 8/65 |
| | | | | 455/41.2 |
| 2015/0242198 A1* | 8/2015 | Tobolski | ............ | G06F 8/65 |
| | | | | 717/172 |
| 2018/0357438 A1* | 12/2018 | Gayton | ............ | G06F 21/6245 |
| 2020/0174778 | * 6/2020 | David | ............ | G06F 11/1433 |

* cited by examiner

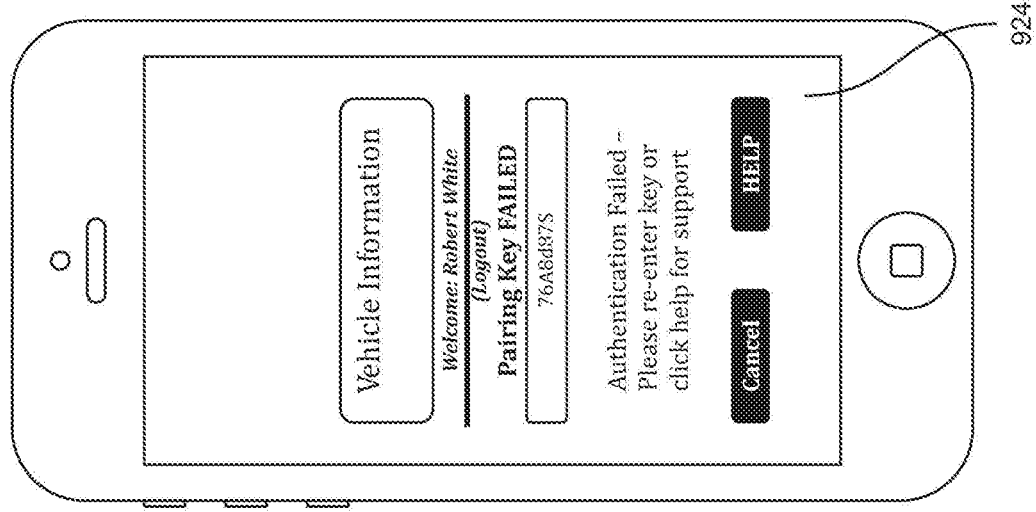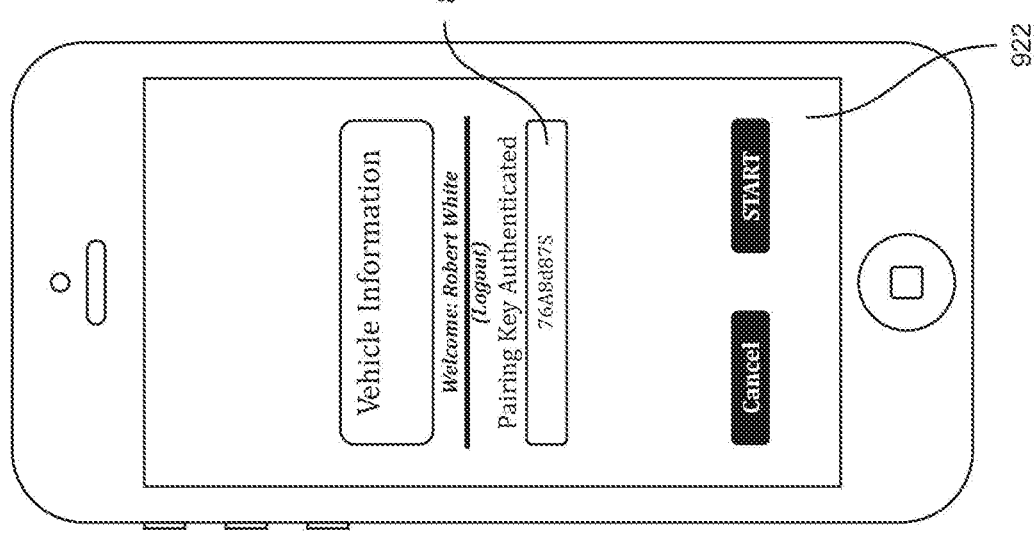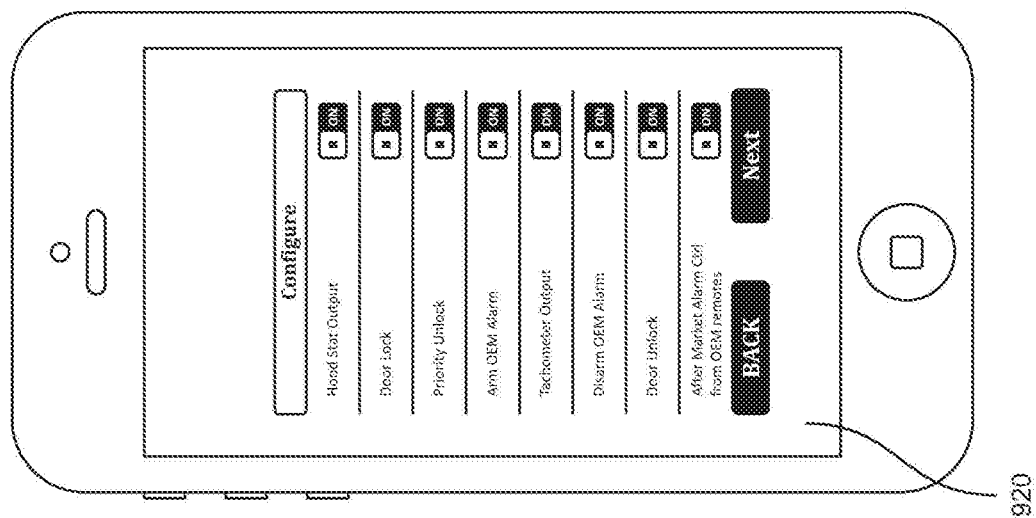
Fig. 10

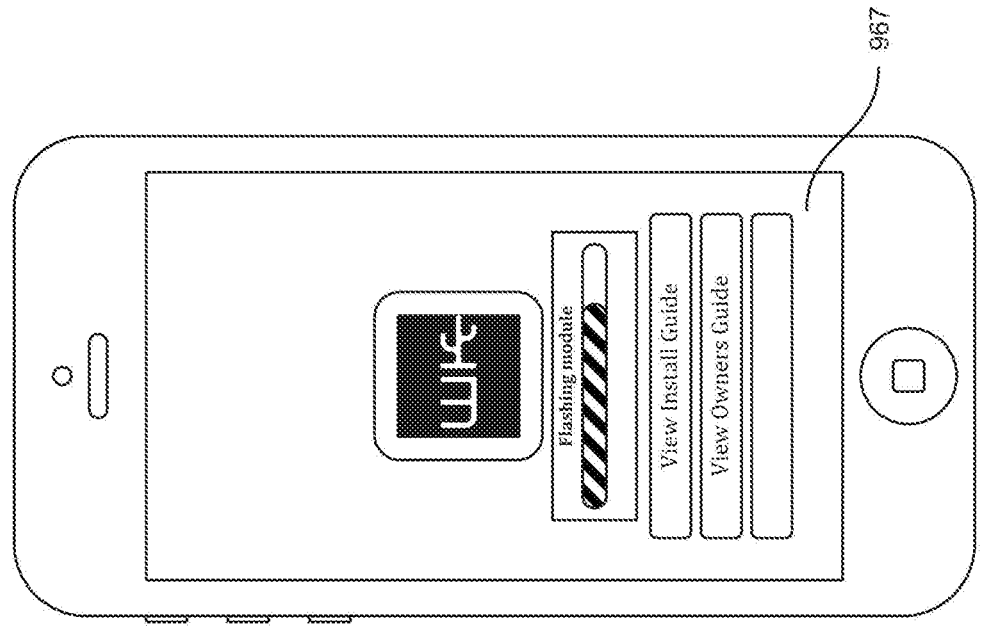
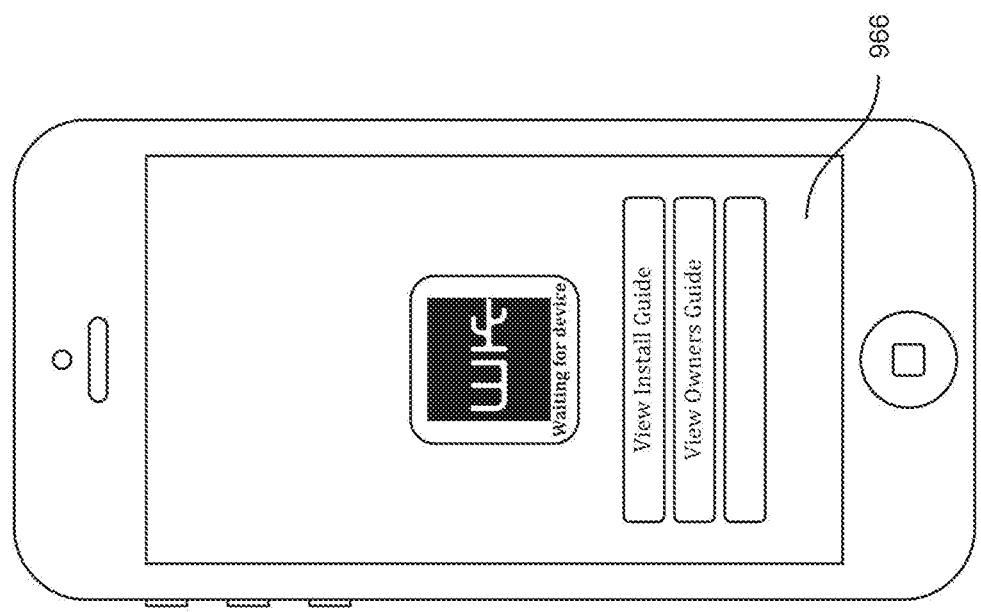
Fig. 11

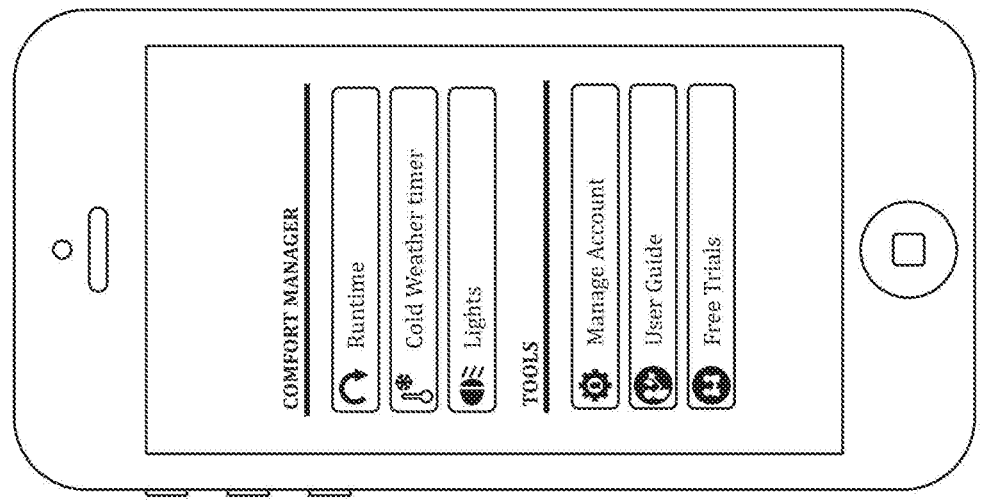
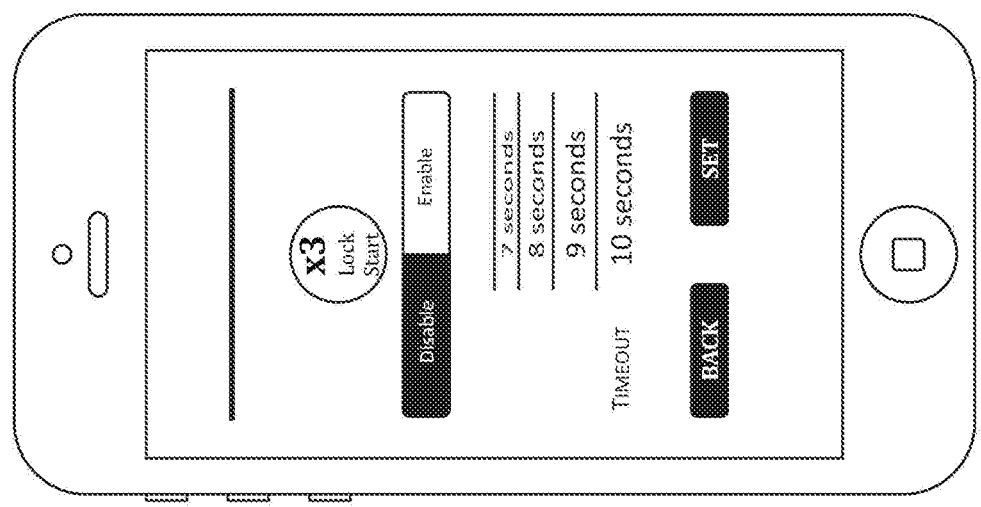
Fig. 12

TELEMATICS SYSTEM

FIELD OF THE INVENTION

The present invention relates to aftermarket technologies in vehicles. In particular, the present invention relates to delivering aftermarket telematics solutions to different vehicles.

BACKGROUND

Telematics is an interdisciplinary field that utilizes integrated use of telecommunications and informatics for application in vehicles. Typically, a telematics feature in a vehicle could be any technologies that are related to sending, receiving and storing information of vehicles. Common telematics features available on the market include vehicle remote start control, security features such as unauthorized entry alerts and starter disable, owner's recognition settings, GPS navigation system, keyless entry, climate control seat activation adjustment, roadside assistance, vehicle diagnostic information, vehicle information monitoring and indication, subscription to vehicle warranty notification, dynamic traction control alerts with repair estimates, processors for replacement radio and stereo system, etc.

A telematics feature can be included as an OEM (original equipment manufacturer) feature or as an aftermarket addition to the vehicle. For example, luxurious vehicles often include GPS navigation systems as an OEM feature that comes with the vehicles at purchase. However, for vehicles that do not come with GPS navigation systems, owners may also purchase aftermarket GPS navigation systems as aftermarket products to be installed in their vehicles.

A telematics solution is usually provided to the end user based on its feature. Hardware and software of a telematics device are delivered together with fixed or limited expandable functionalities. For example, if a car owner would like to add a navigation system to his vehicle, the current option is to purchase an aftermarket GPS navigation system that has software preloaded in the GPS system. The GPS system usually contains relatively fixed functionalities. It is very difficult for the owner to upgrade his GPS system to add any other telematics features that are not included in the GPS system's design. In other words, if the GPS system is not designed to perform vehicle diagnostic tests, it will be very difficult for the owner to upgrade the GPS system to include features that perform vehicle diagnoses. The owner will have to purchase another aftermarket telematics device that performs vehicle diagnosis and have the device installed in his vehicle. Likewise, the new aftermarket telematics device that performs vehicle diagnoses usually also has limited expandable functionalities and cannot be upgraded to perform other telematics features such as remote entry.

Such limited functionalities of current aftermarket telematics devices are inconvenient to the end users, particularly when most telematics devices are installed and mounted in vehicles in a relatively permanent fashion. For examples, many telematics devices are located either behind the central console or at the head unit. In addition, the installation of most telematics devices is time consuming and requires particular expertise. Hence, for car owners to add any telematics features to their vehicles, they often are required to bring their vehicles to specific retailers that have the expertise to install additional devices. This current way to add telematics features to vehicles is inflexible and non-interactive.

SUMMARY

It is an objective of the present invention to provide a flexible and interactive approach to offer different telematics solutions. It is also an objective of the present invention to provide convenient ways for customers to choose and upgrade their telematics devices. It is also another objective of the present invention to provide an individualized solution to customers based on their needs.

In one embodiment of the present invention, the embodiment is a system that delivers different telematics solutions to customers. The system comprises a data source linked to a server, a first customer user interface installed in a first customer mobile device, a second intermediary user interface installed in a second intermediary mobile device, a third intermediary user interface installed in a third intermediary mobile device, an aftermarket telematics device installed in a vehicle, and a potential add-on component with the aftermarket telematics device. The aftermarket telematics device is controlled by at least one telematics application and is compatible with a plurality of telematics applications.

The aftermarket telematics device comprises a storage medium, a transceiver that is adapted to communicate with a plurality of mobile devices. The storage medium contains instructions such that the aftermarket telematics device is configurable to be associated with different mobile devices. The aftermarket telematics device is adapted to receive telematics applications from the mobile devices. Also, the aftermarket telematics device is adapted to collect data from the vehicle and transmit the data to the mobile devices. After a telematics application is installed in the aftermarket telematics device, the vehicle owner may use the first customer user interface installed in his mobile device to control and configure the aftermarket telematics device.

After an aftermarket telematics device is sold to a customer, telematics applications that are compatible with the aftermarket telematics device can be delivered to the customer in different ways. In one scenario, a customer purchases an aftermarket telematics device, but a retailer is responsible for installing the aftermarket telematics device. The delivery of a particular telematics application is achieved through several separate steps. First, the retailer may use a second intermediary mobile device such as a laptop computer to request a particular telematics application that suits the customer's need. The data source is adapted to respond to such request from the second intermediary user interface. Upon proper authentication by the data source for an association between the second intermediary user interface and the aftermarket telematics device, the data source transmits the particular telematics application to the laptop computer and transmits an instruction that will cause the laptop computer to re-transmit the particular telematics application from the laptop computer to the aftermarket telematics device. The retailer may then connect his laptop computer to the aftermarket telematics device via a USB cable. Upon proper authentication, the particular telematics application will be re-transmitted from the laptop computer to the aftermarket telematics device. After the telematics application is installed in the aftermarket telematics device, the delivery of the telematics solution is complete. In some situations, the telematics application is first temporarily stored in the laptop computer, then the laptop computer to re-transmit the particular telematics application to the aftermarket telematics device when the laptop computer is in proximity of the aftermarket telematics device.

In another scenario, a customer has a functional aftermarket telematics device already installed in his vehicle, but he wants to upgrade the aftermarket telematics device. The customer prefers to ask a retailer for assistance. An embodiment of the present invention provides a novel way to deliver a new telematics application without requiring the customer to drive his vehicle back to the retailer to perform both hardware and software upgrade. In this particular scenario, the data source, the aftermarket telematics device, the first customer user interface, and the second intermediary user interface are first associated together and authenticated. The first customer user interface shares the vehicle's information, the customer's profile, and other information from the aftermarket telematics device with the data source. The data source then shares the same information with the second intermediary user interface so that the retailer may review such information using the second intermediary user interface. Subsequently, the retailer selects and requests a particular telematics application to upgrade the customer's aftermarket telematics device. The customer is not required to physically return to the retailer to perform the upgrade. Upon receiving the request from the retailer, the data source transmits the particular telematics application to the customer's first customer mobile device, instead of the second intermediary mobile device that is possessed by the retailer. The server also transmits an instruction that is designed to cause the first customer mobile device to re-transmit the particular telematics application to the aftermarket telematics device. The re-transmission of the telematics application may occur when the first customer mobile device is paired with the aftermarket telematics device using a short-range wireless connection such as Bluetooth or when the first customer mobile device is connected to the aftermarket telematics device via a USB cable. As such, the delivery of the particular telematics application can be achieved when the retailer is away from the customer or the customer's vehicle. In other words, the particular telematics application is first transmitted to the customer's mobile device upon the retailer's remote request, and then re-transmitted to the aftermarket telematics device.

In yet another scenario, the customer also wants to upgrade his aftermarket telematics device, but the telematics feature he wants requires an upgrade of the hardware. For example, the hardware of the aftermarket telematics device only supports remote start functionality, but the customer wants to add a GPS navigation system to his vehicle. In this case, the customer first purchases a piece of add-on hardware from the retailer and connects the add-on to the aftermarket telematics device. Since the additional hardware is provided to the customer as an add-on, the installation is much simpler than installations that require customers purchase a new telematics device. After the add-on is connected, the customer may select a particular telematics application for the add-on hardware manually or using the first customer user interface's recommendations. The retailer who sold the add-on may also request a particular telematics application for the customer.

According to an embodiment of the present invention, the embodiment provides a customer profiler tool that recommends different telematics applications to the customer. The first customer user interface is adapted to collect information such as different search parameters from customers. In the customer profiler tool, the first customer user interface requires customers to input their email and allows the customers to input additional information such as their name, telephone numbers and address. Then the customer profiler tool continues to collect additional profile information such as their gender, age, ZIP code, mobile device, and the mileage of their vehicle.

Based on the information collected, the user interface, working with the data source, generates a profile that recommends certain telematics applications selected from the plurality of different telematics applications stored in the data source. The interface will first filter results by supported vehicle features and then by most suitable features for the customer based on the search parameters collected. The customers may select any of the telematics applications listed and have the telematics applications to be delivered to their aftermarket telematics device.

In some embodiments, a cloud service environment is setup to enhance the results by cross referencing the user's input with statistics that include vehicle warranty status and location-based variables such as crime rates, climate patterns, fuel costs, average income, and legal driving age in order to return potential features of interest. The data source analyzes the customer profile information collected and the statistics cross-referenced using fuzzy logic and provides proper recommendations to the customer.

Through the customer profiler tool, embodiments of the present invention provide an interactive point of sales tool for both the customers and the retailers to determine the most suitable solution for a particular vehicle based on the customers' preference. This provides an individualized solution for each customer based on his needs. The customer profiler tool provides recommended telematics application based on the vehicle condition and the customer's lifestyle. For example, when a customer inputs a ZIP code that has a high crime rate, the customer profiler tool will analyze the ZIP code and recommend security features such as remote start and GPS tracking to the customer. When another customer inputs a ZIP code that has a high household income and the vehicle is identified is a luxurious vehicle, the customer profiler tool, using fuzzy logic generator, will recommend premium telematics applications that provide better services.

BRIEF DESCRIPTION OF THE DRAWINGS

FIG. 7 is an illustrative view of some example views of an user interface in accordance with some embodiments of the present invention.

FIG. 9 is an illustrative view of some example views of an user interface in accordance with some embodiments of the present invention.

FIG. 10 is an illustrative view of some example views of an user interface in accordance with some embodiments of the present invention.

FIG. 11 is an illustrative view of some example views of an user interface in accordance with some embodiments of the present invention.

FIG. 12 is an illustrative view of some example views of an user interface in accordance with some embodiments of the present invention.

DETAILED DESCRIPTION OF EMBODIMENTS

The following description is made for the purpose of illustrating the general principles of the invention and should not be taken in a limiting sense. The scope of the invention is best determined by reference to the appended claims.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

Figure 1:
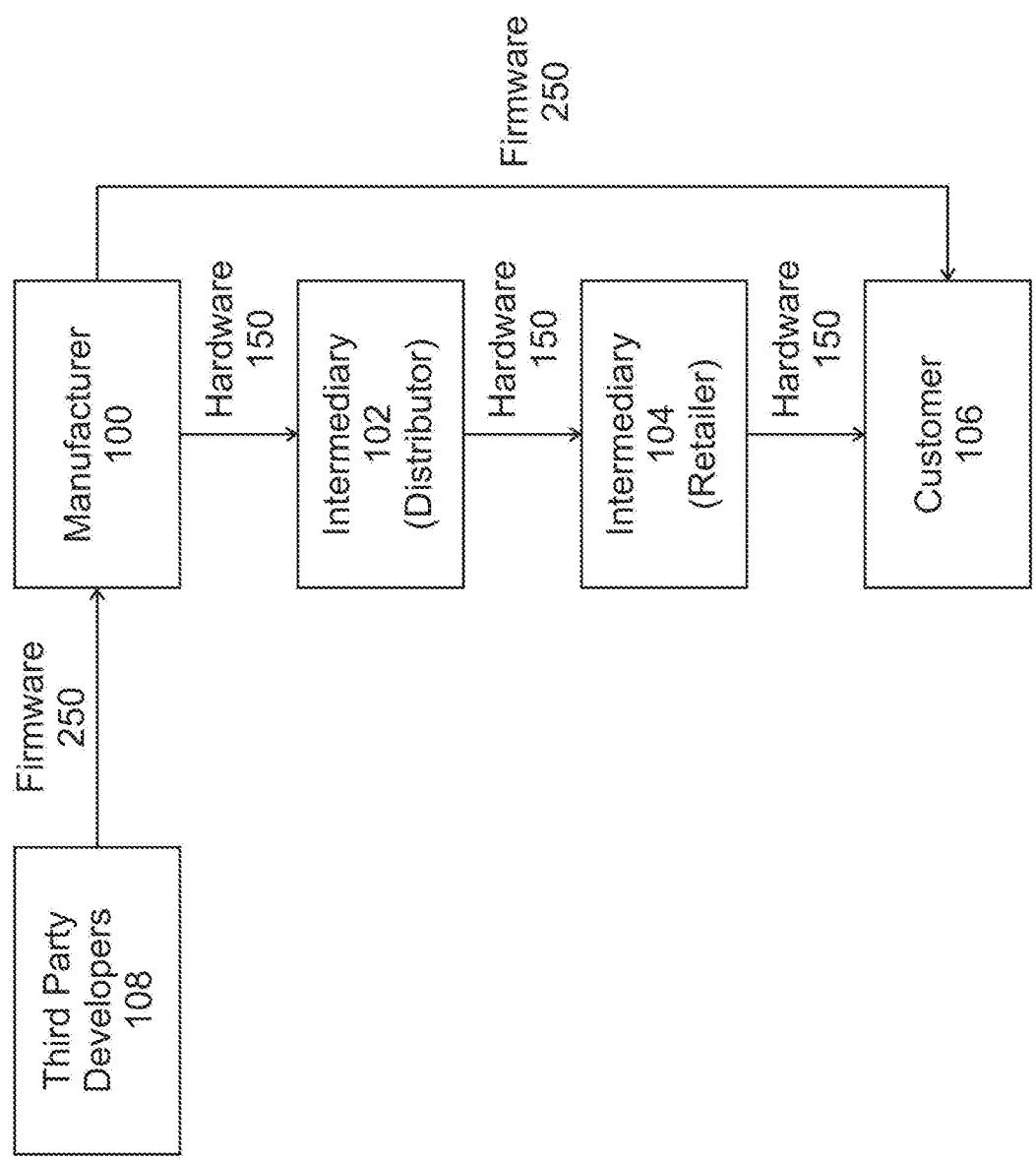
FIG. 1 is a block diagram representing the parties involved in a delivery of a telematics solution from a manufacturer to a customer in accordance with an embodiment of the present invention.

Referring to FIG. 1, it is a schematic representation of the parties involved in a delivery of a telematics solution from a manufacturer to a customer in accordance with an embodiment of the present invention. The parties involved in this transaction include a manufacturer 100, an intermediary 102, another intermediary 104, a customer 106 and third party developers 108. The intermediaries shown in FIG. 1 represent intermediate parties between the manufacturer 100 and the customer 106 when an aftermarket telematics device is sold to the customer 106. In a particular embodiment, the intermediary 102 is a distributor who purchases aftermarket telematics devices directly from the manufactures in quantities and the intermediary 104 is a retailer who purchases aftermarket telematics devices from the distributor and sells aftermarket telematics devices to the customers 106.

FIG. 1 illustrates the difference in delivering the hardware component 150 and the software component 250 of a telematics solution from the manufacturer 100 to the customer 106 in accordance with an embodiment of the present invention. With respect to the hardware component 150 such as an aftermarket telematics device and an add-on part, it is designed and manufactured by the manufacturer 100. The manufacturer 100 then delivers the hardware component 150 to the customer 106 via one or more than one intermediaries 102 and 104. With respect to the software component 250 such as a telematics application, it is usually designed and developed by the manufacturer 100. Instead of going through the intermediaries, the software component 250 is directly delivered to the customer 106 via remote means that will be discussed in further detail below. In some embodiments, the manufacturer 100 discloses the hardware specification of the aftermarket telematics devices to limited third party developers 108 for the developers 108 to develop telematics applications 250 that are compatible with the hardware component 150. After the telematics applications 250 are developed, they are uploaded to a server and are then directly delivered to the customer 106 via remote means that will be discussed in further detail below. In other embodiments, the manufacturer 100 provides an open source environment to allow any third party developers 108 to develop telematics applications 250 that are compatible with the manufacturer's aftermarket telematics devices.

Figure 2:
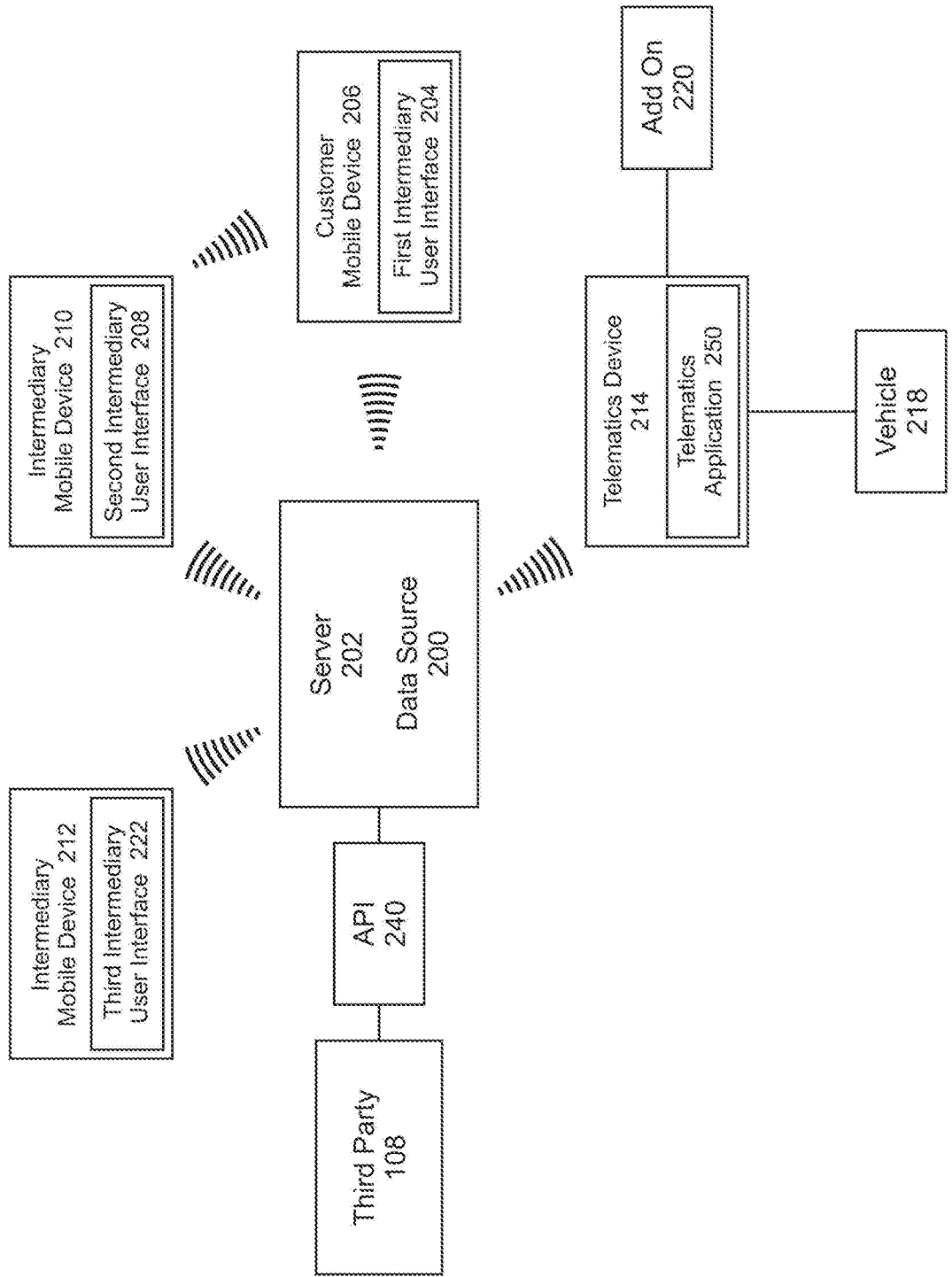
FIG. 2 is a schematic representation of a system of telematics features in accordance with an embodiment of the present invention.

Referring now to FIG. 2, it is a schematic representation of a system to deliver telematics solution to a customer 106 in accordance with an embodiment of the present invention. The system comprises a data source 200 linked to a server 202, a first customer user interface 204 installed in a first customer mobile device 206, a second intermediary user interface 208 installed in a second intermediary mobile device 210, a third intermediary user interface 222 installed in a third intermediary mobile device 212, an aftermarket telematics device 214 installed in a vehicle 218, and a potential add-on component 220 linked to the aftermarket telematics device 214. The aftermarket telematics device 214 is controlled by at least one telematics application 250 and is compatible with a plurality of telematics applications 250. According to some preferred embodiments, the data source 200 is associated with a software application platform that is maintained by a manufacturer 100. As such, the manufacturer 100 controls the development, quality, availability and delivery of any telematics applications 250 available on the data source 200. The data source 200 is linked to the server 202, which stores a plurality of telematics applications 250 that are compatible with the aftermarket telematics devices 214. Preferably, the server 202 is a cloud-based server.

The aftermarket telematics device 214 is capable of working with a plurality of telematics applications 250. The aftermarket telematics device 214 comprises a storage medium, a transceiver that is adapted to communicate with a plurality of mobile devices 206, 210, and 212 via protocols such as Bluetooth, Wi-Fi, and/or USB cable. The storage medium contains instructions such that the aftermarket telematics device is configurable to be associated with the mobile devices 206, 210, and 212. The aftermarket telematics device 214 is adapted to receive telematics applications 250 from the mobile devices 206, 210, and 212 after the mobile devices are associated with the aftermarket telematics device 214. Also, the aftermarket telematics device 214 is adapted to collect data from the vehicle 218 and transmit the data to the mobile devices 206, 210, and 212 associated with the telematics device 214. After a telematics application 250 is installed in the aftermarket telematics device 214, the first customer user interface 204 can be used to control and configure the aftermarket telematics device 214 in a manner to be discussed in further details below.

In some embodiments, the manufacturer 100 provides an application program interface (API) 240 for an open developer environment to allow third party developers to utilize the application program interface 240 to develop third party telematics applications 250. The availability of third party applications allows customers 106 to use the telematics devices 214 for features that are beyond what the manufacturer 100 originally designs. At least four data points and sources are available to the third party developers 108 to develop telematics applications 250. First, vehicle data for the vehicle 218, including data bus information such as OBDII data and other CAN enabled controls, are available. Second, there can be a cloud server for vehicle warranty information, demographics and weather. Third, data are also available for applications or interfaces used in the mobile devices 206, 210, and 212. Fourth, a data point can be found for different OEM application program interfaces that are offered by the automakers. Developers 108 may choose from the different data buckets to develop applications that can be purchased by the customers 106 using an in-app purchasing feature of the first customer user interface 204 as discussed in further detail below.

In one embodiment, the server 202 is maintained and controlled by the manufacturer 100. In this regard, customers 106 may go to a website or an application store that is maintained by the manufacturer 100 to select telematics applications 250 that are available for their aftermarket telematics devices 214. The application store is also the primary marketplace for third party telematics applications.

Alternative, the server 202 is maintained by a third party and customers 106 may go to a third party application store to select telematics applications for their aftermarket telematics devices 214. For example, the third party application store could be Google® Play or Apple® App Store.

In some embodiments, the data source 200 is adapted to communicate with any number of different user interfaces 204, 208, and 222. While two intermediary user interfaces 208 and 222 are shown in the particular embodiment of FIG. 2, there could be any number of intermediary user interfaces. Preferably, the user interfaces 204, 208, and 222 are provided and transmitted by the manufacturer 100. For example, the user interfaces 204, 208, and 222 could be manufacturer's 100 software applications that are installed in different mobile devices 206, 210, 212.

Through the mobile devices 206, 210, 212, the users 102, 104, and 106 can interact with the data source 200 and control the aftermarket telematics device 214. In a particular embodiment, the user interfaces 204, 208, and 222 communicate with the data source 200 via long-ranged communication protocol such as the Internet or wireless 4G network. On the other hand, the interfaces 204, 208, and 222 communicate with the aftermarket telematics device 214 with short-ranged protocol such as Bluetooth, Wi-Fi, and/or USB cable between a pairing of the aftermarket telematics device 214 and the mobile devices 206, 210, 212.

The differences of the user interfaces 204, 208, and 222 are mainly based on their end users. In the particular embodiment shown in FIG. 2, the end user of the first customer user interface 204 is the customer 106 who purchased an aftermarket telematics device 214 that is installed in the customer's 106 vehicle 218. The first customer user interface 204 is installed in the first customer mobile device 206, which is a mobile device possessed by the customer 106. It is noteworthy that those skilled in the art would understand that the term mobile device here is not limited to a smart phone or tablet. It could also refer to any computer, such as a laptop or even a desktop computer, or other electronic device.

In the particular embodiment shown in FIG. 2, the end user of the second intermediary user interface 208 is a retailer 104 who sold the aftermarket telematics device 214 to the customer 106. The second intermediary user interface 208 is installed in the second intermediary mobile device 210 that is used by the retailer 104. The second intermediary mobile device 210 could be the retailer's 104 mobile phone, tablet, computer, or other similar electronics device at the retailer's 104 store. Likewise, the end user of the third intermediary user interface 222 is a distributor 102 who distributes aftermarket telematics devices 214 from the manufacturer 100 to the retailer 104.

In one embodiment, the first customer user interface 204 is configurable to be associated with the aftermarket telematics device 214. Preferably, each aftermarket telematics device 214 made by the manufacturer 100 is assigned with a specific and unique identifier. The identifier could be a serial number of the aftermarket telematics device 214. When the customer 106 purchases the aftermarket telematics device 214, the customer 106 may also download the first customer user interface 204 and install the user interface 204 in the customer's 106 mobile device 206. The identifier information of the aftermarket telematics device 214 is then input into the first customer user interface 204 when the aftermarket telematics device 214 and the first customer user interface 204 begin to establish a connection. Once the appropriate identifier information is input and is authenticated, the first customer user interface 204 is associated with the aftermarket telematics device 214 in this authentication process. Now the customer 106 may interact with the aftermarket telematics device 214 via the first customer user interface 204 in different manners that will be discussed in greater detail below.

In some embodiments, a retailer 104 obtains the right to sell aftermarket telematics devices 214 from the manufacturer 100 or through a distributor 102. Once the retailer 104 becomes an authorized dealer to sell the aftermarket telematics devices 214, the manufacturer 100 provides and transmits a second intermediary user interface 208 to the retailer 104. In a preferred embodiment, the manufacturer 100 will also provide and deliver second intermediary mobile device(s) 210 to the retailer 104. For example, when the retailer 104 becomes an authorized dealer for the manufacturer 100, the manufacturer 100 will provide the retailer 104 with a number of second intermediary mobile devices 210, including a desktop computer, a tablet with a credit card swipe tool, a smartphone accessory with transaction capacity plug in. In this situation, the second intermediary user interface 208 is pre-installed in the second intermediary mobile devices 210.

After the retailer 104 becomes an authorized retailer, the second intermediary user interface 208 is configurable to be associated with the aftermarket telematics device 214. When the retailer 104 receives a number of aftermarket telematics devices 214 from a distributor 102, the aftermarket telematics devices 214 are associated with the second intermediary user interface 208 using the identifier. When the retailer 104 sells a particular aftermarket telematics device 214 to a customer 106, the transaction is recorded by the second intermediary user interface 208 and the unique identifier of the particular aftermarket telematics device 214 is associated with the transaction. The second intermediary user interface 208 transmits the transaction and the identifier to the data source 200 so that the data source 200 may record, verify and authenticate the transaction and the identifier. Now, after the second intermediary user interface 208 is associated with the particular aftermarket telematics device 214, the data source 200 will have a record that the retailer 104 is also associated with the customer 106 who purchased the particular aftermarket telematics device 214.

The third intermediary user interface 222 is also configurable to be associated with the aftermarket telematics device 214 in a similar fashion described in the preceding paragraph. Typically, the third intermediary user interface 222 is controlled by a distributor 102. When the distributor 102 distributes aftermarket telematics devices 214 to the retailer 104, the third intermediary user interface 222 is associated with those aftermarket telematics devices 214. When a particular aftermarket telematics device 214 is sold to a customer 106, the third intermediary user interface 222 is further associated with the customer 106, the retailer 104 and the transaction together. The data source 200 has a record of such association and may provide authentication of such association.

Aftermarket telematics devices 214 are devices that are adapted to be installed in vehicles 218 to provide different telematics features. Preferably, the aftermarket telematics devices 214 are connected to the vehicle data bus system such that the aftermarket telematics devices 214 can provide features such as on-board diagnostics system, OBDII, engine performance monitoring, and dashboard monitoring.

The aftermarket telematics devices 214 are configured to communicate with external devices such as mobile device 206, 210, and 212 and/or even directly with the server 202 and the data source 200. In some embodiments, the aftermarket telematics device 214 has the capacity to communicate with external devices such as mobile device 206, 210, and 212 using wireless means such as Wi-Fi or Bluetooth. For example, the aftermarket telematics devices 214 can be paired with the first customer mobile device 206 via Bluetooth. For some embodiments, the aftermarket telematics devices 214 are also designed to communicate with other external devices using wired connections such as USB cables. Short-range wireless means such as Bluetooth is preferred because aftermarket telematics devices 214 are sometimes installed behind the dashboard of vehicles 218. In these situations, USB cables are less preferable because the aftermarket telematics devices 214 are often installed behind the dashboard. For some other embodiments, the aftermarket telematics devices 214 have the capacity to communicate with the server 202 directly through long-range wireless means such as a 4G network.

In preferred embodiments, the aftermarket telematics device 214 further comprises an add-on option 220 that allows an add-on hardware 220 to be connected with the aftermarket telematics device 214 to provide additional telematics features. The add-on option 220 allows additional telematics features to be added to the aftermarket telematics device 214 after the customer 106 purchases the aftermarket telematics device 214. For example, a particular aftermarket telematics device 214 is designed to provide a remote start feature. The customer 106 may purchase additional telematics features such as a GPS navigation feature through buying an add-on hardware 220 that contains the GPS feature.

After an aftermarket telematics device 214 is sold to a customer 106 and the association among, for example, the manufacturer 100, the distributor 102, the retailer 104, and the customer 106 are established, telematics applications 250 that are compatible with the aftermarket telematics device 214 can then be delivered to the customer 106 in different ways. In some embodiments, once the telematics applications 250 are delivered to the aftermarket telematics device 214, the applications 250 will be stored on the cloud and be available for download using a unique identifier generated by the server 202 for future re-download.

In one scenario, a customer 106 purchases an aftermarket telematics device 214 and decides to install the aftermarket telematics device 214 to his vehicle 218 on his own. The particular aftermarket telematics device 214 is equipped with a short-range wireless connectivity. Upon the customer's 106 request, the data source 200 sends a first customer user interface 204 to the customer's mobile device 206, which is the customer's 106 smart phone 206 in this scenario. After the first customer user interface 204 is installed in the smart phone 206, the customer 106, using the first customer user interface 204, may manually select a particular telematics application 250 from a plurality of telematics applications stored in the data source 200 or make a selection based on the first customer user interface's 204 recommendations. An association between the first customer user interface 204 and the aftermarket telematics device 214 is authenticated by the first customer user interface 204. Afterwards, the data source 200 is adapted to respond to the requests from the first customer user interface 204. In this particular scenario, the delivery of the particular telematics application 250 is achieved through several separate steps. First, the data source 200 transmits the particular telematics application 250 to the customer's smart phone 206. The data source 200 also transmits an instruction that is adapted to cause the smart phone 206 to re-transmit the particular telematics application 250 from the smart phone 206 to the aftermarket telematics device 214. As such, the particular telematics application 250 is first downloaded to the smart phone 206 and is temporarily stored in the smart phone 206. Then, when the customer 106 carries the smart phone 206 to a proximity to the aftermarket telematics device 214, such as when the customer 106 is sitting inside the vehicle 218, the smart phone 206 pairs with the aftermarket telematics device 214 via the short-range wireless connectivity such as Bluetooth. Once the smart phone 206 and the aftermarket telematics device 214 are paired, the particular telematics application 250 is transmitted from the smart phone 206 to the aftermarket telematics device 214 and is installed in the aftermarket telematics device 214.

In a second scenario, a customer 106 purchases an aftermarket telematics device 214, but the retailer 104 is responsible for installing the aftermarket telematics device 214 for the customer 106. As discussed above, when the retailer 104 becomes an authorized retailer, the manufacturer 100 provides a second intermediary user interface 208 to the retailer 104. Then when the aftermarket telematics device 214 is sold, the retailer 104 uses a second intermediary mobile device 210 such as a laptop computer to request a particular telematics application 250 that suits the customer's need. The data source 200 is adapted to respond to the request from the second intermediary user interface 208. The retailer 104 connects his laptop computer 210 to the aftermarket telematics device 214 via a USB cable. Upon proper authentication by the data source 200 for an association between the second intermediary user interface 208 and the aftermarket telematics device 214, the data source 200 transmits the particular telematics application 250 to the laptop computer 210 and transmits an instruction to cause the laptop computer 210 to re-transmit the particular telematics application 250 from the laptop computer 210 to the aftermarket telematics device 214. After the telematics application 250 is installed in the aftermarket telematics device 214, the delivery of the telematics solution is complete.

In a third scenario, a customer 106 already has a functional aftermarket telematics device 214 installed in his vehicle 218, but he wants to upgrade his aftermarket telematics device 214. The customer 106 prefers to ask the retailer 104 for assistance. An embodiment of the present invention provides a novel way to deliver a new telematics application 250 without requiring the customer 106 to drive his vehicle 218 back to the retailer 208. In this particular scenario, the data source 200, the aftermarket telematics device 214, the first customer user interface 204, and the second intermediary user interface 208 have already been associated together and authenticated by the methods discussed above. The first customer user interface 204 shares the vehicle's 218 information, the customer's 106 profile, and other information from the aftermarket telematics device 214 with the data source 200. The data source 200 then shares the same information with the second intermediary user interface 208 so that the retailer 104 may review such information using the second intermediary user interface 208. As such, the retailer 104 is able to select and request a particular telematics application 250 for the customer 106 to upgrade the customer's 106 aftermarket telematics device 214. The customer 106 does not have to physically return to the retailer 104 to perform the upgrade. Upon receiving the request from the retailer 104, the data source 200 transmits the particular telematics application 250 to the customer's 106 first customer mobile device 206 instead of to the second intermediary mobile device 210 that is possessed by the retailer. The server 202 also transmits an instruction that is adapted to cause the first customer mobile device 206 to re-transmit the particular telematics application 250 to the aftermarket telematics device 214. In other words, the particular telematics application 250 is first transmitted to the customer's 106 mobile device 206 upon the retailer's 104 remote request, and then re-transmitted to the aftermarket telematics device 214. The re-transmission of the telematics application 250 may occur when the first customer mobile device 206 is paired with the aftermarket telematics device 214 using a short-range wireless connection such as Bluetooth or when the first customer mobile device 206 is connected to the aftermarket telematics device 214 via a USB cable. Alternatively, if the aftermarket telematics device 214 has a long-range wireless capacity such as 4G-network connectivity, the server may deliver the particular telematics application 250 selected by the retailer 104 directly to the aftermarket telematics device 214. As such, the delivery of the particular telematics application 250 can be achieved when the retailer 104 is away from the customer's 106 vehicle 218.

In a fourth scenario, the customer 106 also wants to upgrade his aftermarket telematics device 214, but the telematics feature that he desires requires an upgrade of the hardware. For example, the aftermarket telematics device 214 only supports remote start functionality, but the customer 106 wants to add a GPS navigation system to his vehicle 218. In this case, the customer 106 first purchases a piece of add-on hardware 220 from the retailer 100 and connects the add-on 220 to the aftermarket telematics device 214. As the additional hardware is provided to the customer 106 as an add-on, the installation is much simpler than the installation where the customer has to purchase a new telematics device. It simply requires the customer to plug in the add-on 220 to the aftermarket telematics device 214. After the add-on is connected, the customer 100 may select a particular telematics application 250 for the add-on hardware 220 manually or using the first customer user interface's 204 recommendations. Alternatively, the customer 100 may ask the retailer 104 for assistance and the retailer may request the delivery of a particular telematics application 250 to the aftermarket telematics device 214 as discussed above.

While only several scenarios are discussed above, those skilled in the art would understand that the ways to deliver a telematics solution is not limited to the explicit discussions of the above scenarios. Different ways of delivering telematics solutions can also be the combination of different scenarios.

Figure 3:
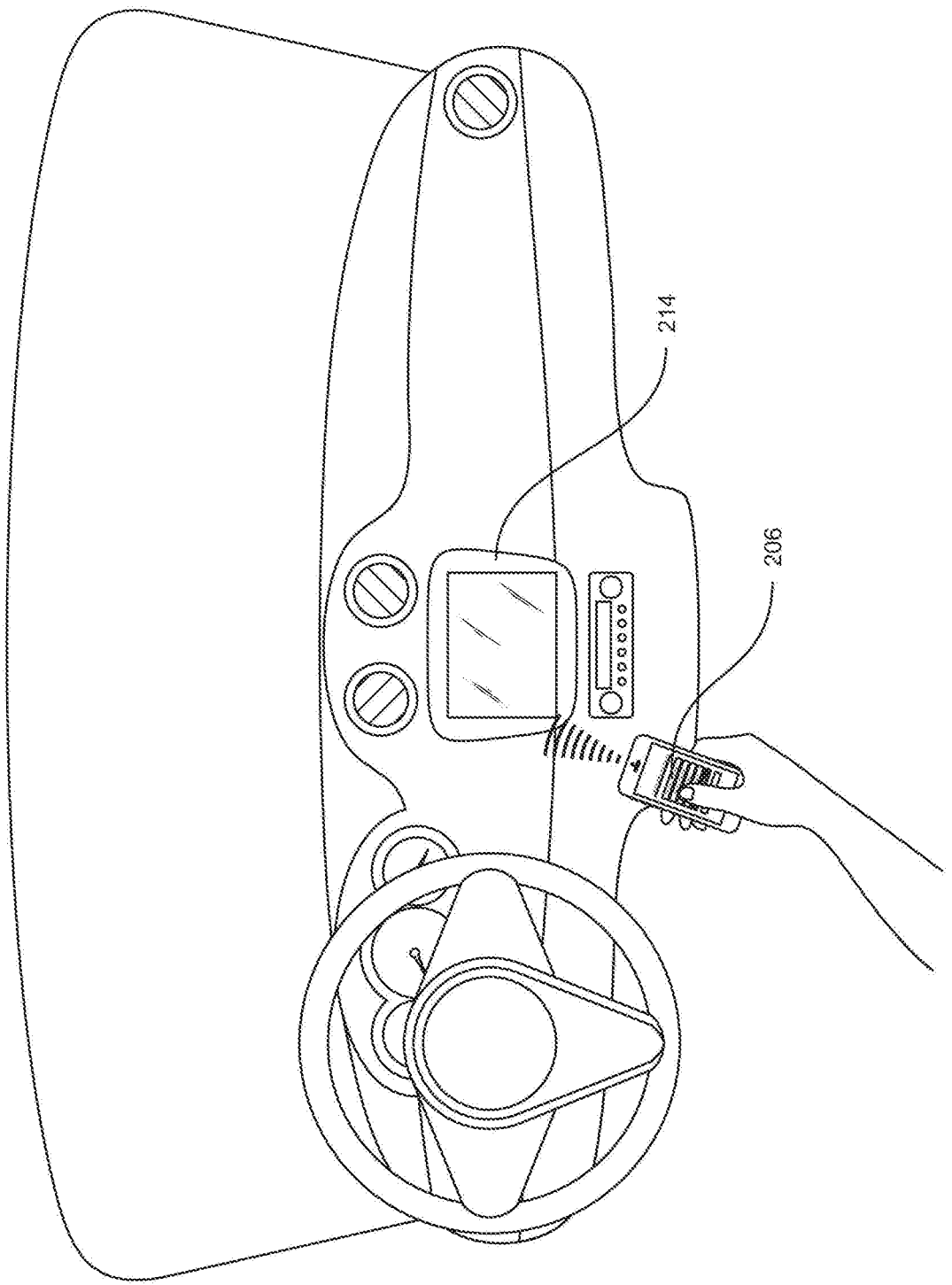
FIG. 3 is an illustrative representation of an aftermarket telematics device installed in a vehicle and the interaction between the user using his mobile device and the telematics device in accordance with an embodiment of the present invention.

Now referring to FIG. 3, an illustrative representation of an aftermarket telematics device 214 installed in a vehicle 218 is presented. The aftermarket telematics device 214 is installed in the central console of the vehicle 218 behind the radio 302. The aftermarket telematics device 214 provides different telematics features such as remote start and monitoring of the vehicle information. A customer 106, who is the driver, can control the aftermarket telematics device 214 through the vehicle 218, such as by using the radio or the buttons on the steering wheel. Additionally, the customer 106 can control the aftermarket telematics device 214 using the first customer user interface 204 installed in the first mobile device 206. The driver may also request delivery of any particular telematics applications 205 using the first customer user interface 204.

Figure 4:
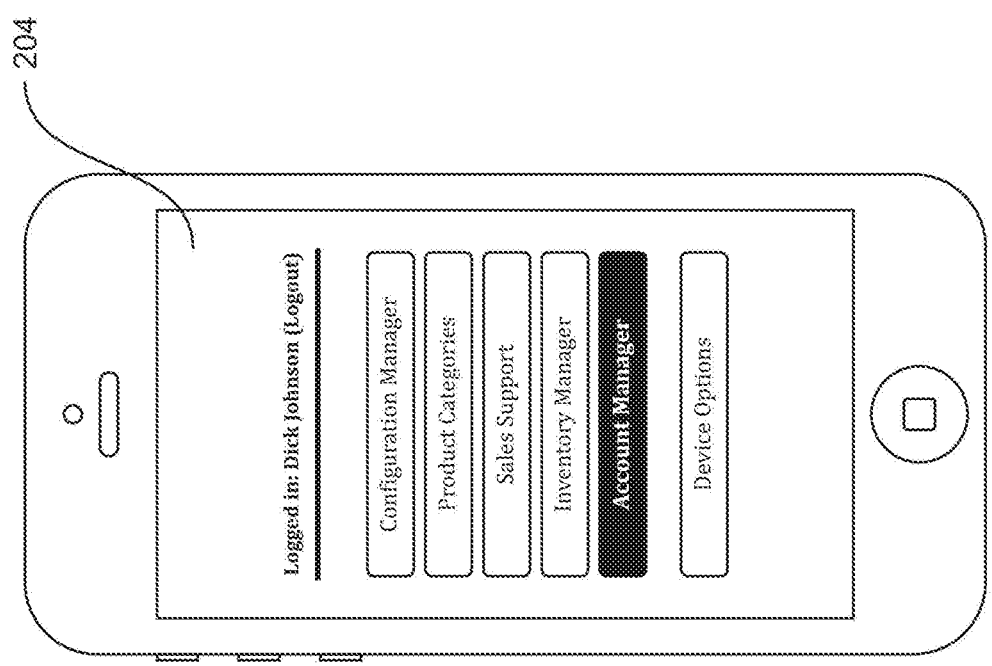
FIG. 4 is an illustrative view of some example views of an user interface in accordance with some embodiments of the present invention.

Now referring to FIG. 4, it represents a first customer user interface 204 in accordance with some embodiments of the present invention. The first customer user interface 204 provides a menu of different options from which customers 106 may choose. In the particular embodiment shown in FIG. 4, the first customer user interface 204 contains features including Configuration Manager, Product Categories, Sales Support, Account Manager and Aftermarket Telematics Device Options.

Figure 5:
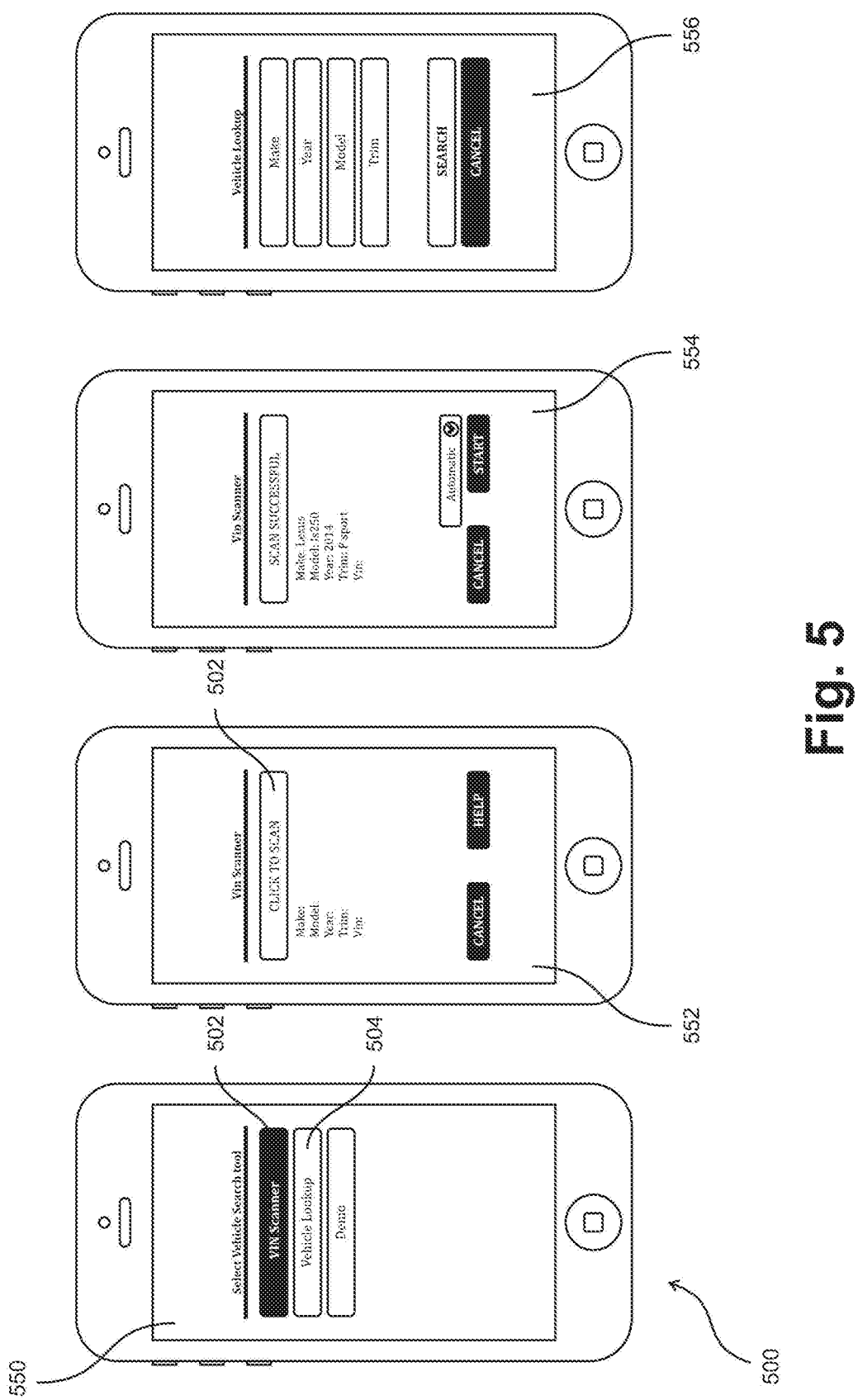
FIG. 5 is an illustrative view of some example views of an user interface in accordance with some embodiments of the present invention.

The drawings in FIG. 5 represent a configuration feature 500 of the user interfaces 204, 208, and 222 in accordance with some embodiments of the present invention. In one embodiment, the configuration feature 500 could be selected from the first customer user interface 204 shown in FIG. 4 under the Configuration Manager option. The configuration feature 500 allows the customer 106 or any intermediaries 102 or 104 to configure their user interfaces 204, 208, and 222 and the aftermarket telematics device 214. As shown in step 550, the configuration feature 500 provides two different ways, VIN scanning 502 and vehicle lookup 504, to configure the user interface and the aftermarket telematics device. Using the VIN scanning 502 as shown in step 552 and 554, the user interfaces directly scan the vehicle identification number (VIN) of the vehicle 214. The VIN scanning 502 also allows users to manually input the VIN into the interface. After the VIN is scanned or input, the user interface transmits the VIN to the server 202 to determine the vehicle's 218 information such as the vehicle's make, model, year, trim, and gearbox and automatically displays and associate the vehicle information with the user interface and the aftermarket telematics device.

Alternatively, users may select the vehicle 218 manually by using the vehicle lookup feature 504 as shown in step 556. The users may find their vehicles 218 by narrowing the search result using the vehicle make, year, model, and/or trim. Once the vehicle is located, the vehicle information will be displayed and associated with the user interface and the aftermarket telematics device.

The configuration feature 500 can be done by the customer 106 or by any of the intermediaries 102 or 104 when they sell or install the aftermarket telematics device 214 for the customer 106. Once the vehicle information is configured, the first customer user interface 204, the second intermediary user interface 208, and the third intermediary user interface 222 will contain the particular vehicle's 218 information for the particular customer 106 that is associated with the particular aftermarket telematics device 214.

Figure 6:
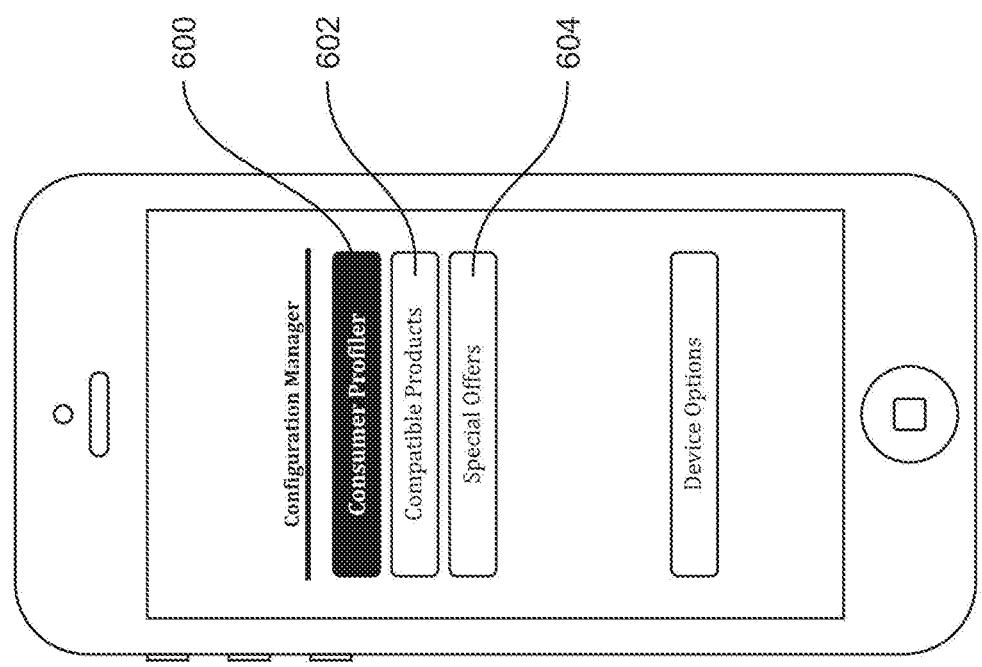
FIG. 6 is an illustrative view of some example views of an user interface in accordance with some embodiments of the present invention.

FIG. 6 shows different options for customer 106 to select different telematics applications 250 in accordance with some embodiments of the present invention. In one embodiment, the options are a consumer profiler tool 600, compatible products 602, and special offers 604.

Figure 7:
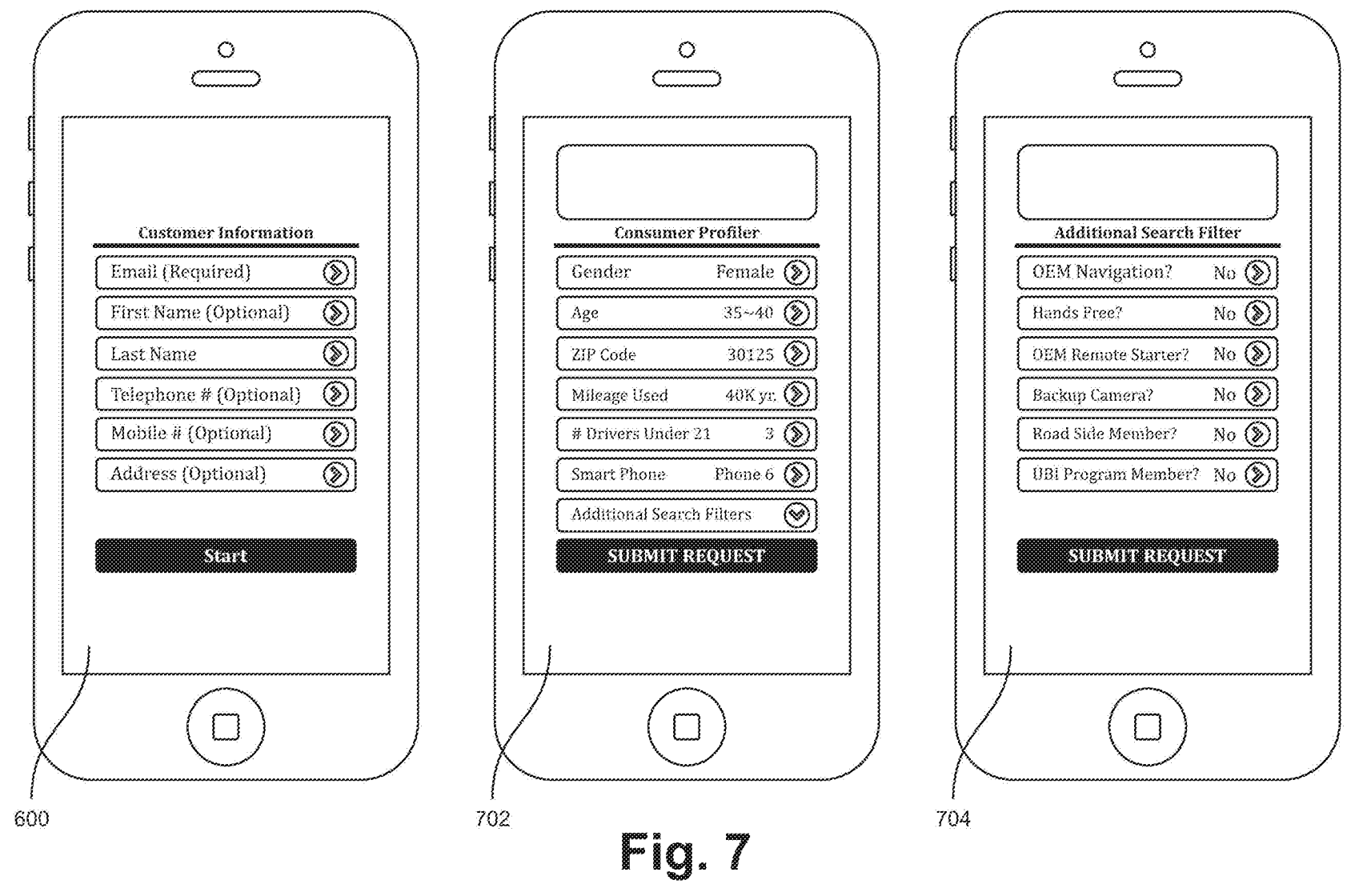

FIG. 7 represents the customer profiler tool 600 in accordance with an embodiment of the present invention. The first customer user interface 204 is adapted to collect information such as different search parameters from customers 106. The first customer user interface 204 should already have the vehicle information after the configuration steps shown in FIGS. 4 and 5. In the customer profiler tool 600, the first customer user interface 204 requires customers 106 to input their email and allows the customers 106 to input additional information such as their name, telephone numbers and address. Then on the next page 702, the customer profiler tool 600 continues to collect the customers' 106 profile information such as their gender, age, ZIP code, mobile device 206, and the mileage of their vehicle 218. The customer profiler tool 600 also allows the customers 106 to input advanced search parameters. For example, in the additional search filter 704, the customer 106 may tell the first customer user interface 204 whether their vehicle 218 has certain features such as navigation, hands free, remote starter, back-up camera, and/or road side assistance.

Figure 8:
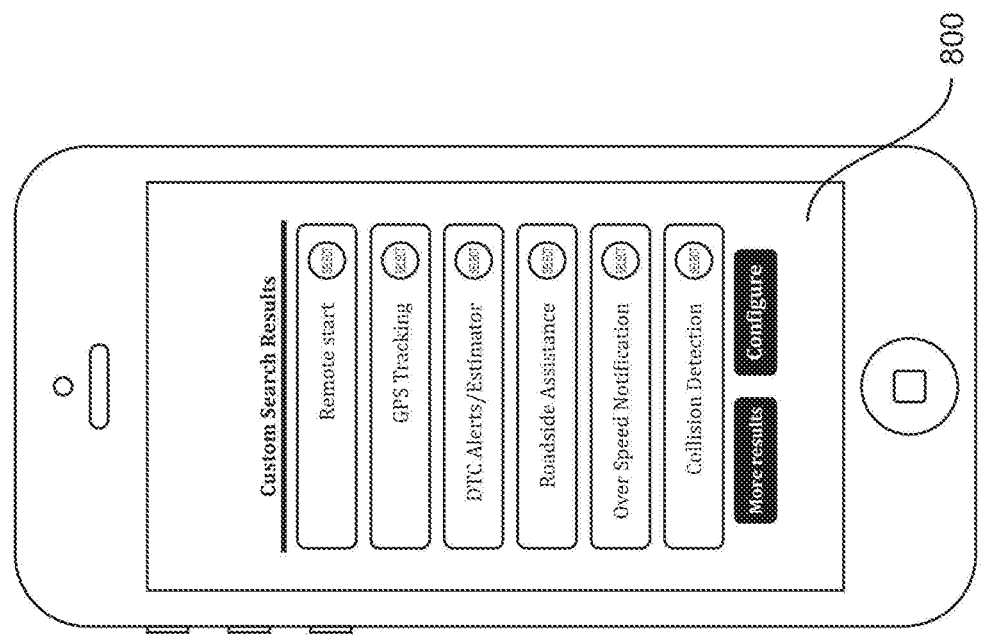
FIG. 8 is an illustrative view of some example views of an user interface in accordance with some embodiments of the present invention.

FIG. 8 continues to represent the customer profiler tool 600 in accordance with an embodiment of the present invention. The first customer user interface 204 transmits the data input by the customer 106 to the data source 200. Based on the information collected during the steps shown in FIG. 7, the first customer user interface 204, working with the data source 200, analyzes the data and generates a user profile that will recommend different telematics applications 250 selected from the plurality of different telematics applications stored in the data source 200 to the customer 106. The recommended result is shown as the search results as shown in FIG. 8. The search result will be displayed by supported vehicle features first and then by most suitable features for the customer 106 based on the search parameters collected. As shown in FIG. 8, the first customer user interface 204 lists telematics applications 250 that are compatible with the customer profile. The customer 106 may select any of the telematics applications 250 listed and have the telematics applications 250 to be delivered to their aftermarket telematics device 214.

In some embodiments, a cloud services environment is setup to enhance the search and recommended results. This is achieved by cross referencing the user's input with statistics that include vehicle warranty status and location-based variables such as crime rates, climate patterns, fuel costs, average income, and legal driving age in order to return potential features of interest. The data source 200 analyzes the customer profile information collected and the statistics cross-referenced using fuzzy logic and provides proper recommendations to the customer 106. Telematics solutions such as, but not limited to, remote start, security, telematics GPS tracking, Geo fence, speed alerts, road side assistance, DTC notifications, radio replacement options, custom gauges, and etc. are all available as potential results.

Through the customer profiler tool 600, embodiments of the present invention provide an interactive point of sales tool for both the customers 106 and the retailers 104 to determine the most suitable solution for a particular vehicle 218 based on the customer's preference. This provides an individualized solution for each customer based on his or her needs. The customer profiler tool 600 provides recommended telematics applications 250 based on the vehicle condition and the customer's lifestyle. As such, embodiments of the present invention are able to deliver telematics solutions that are best suit to the customer's situation by focusing on the features that may be of interest to the customer based on the profile data provided.

For example, when a customer 106 inputs a ZIP code that has a high crime rate, the customer profiler tool 600 will analyze the ZIP code and recommend security features such as remote start and GPS tracking to the customer. When another customer 106 inputs a ZIP code that has a high household income and the vehicle 218 is identified as a luxurious vehicle, the customer profiler tool 600, using a fuzzy logic generator, will recommend premium telematics applications 250 that provide better services.

In another example according to an embodiment of the present invention, for example, when a middle-aged driver who drives a minivan, who has two teen drivers, and who drives long miles per year in a cold area inputs his/her profile information, the customer profiler tool 600, using a fuzzy logic generator, will recommend features such as remote starters, over-speed notifications and DTC (dynamic traction control) notifications to the customer. In yet another example, when a young person who drives a new sport car and lives in an area with relatively high crime rate input his or her zip code, then the customer profiler tool 600 will recommend features such as premium 2-way LCD remote start and security systems, smart phone alarm notifications and radio replacements with virtual gauges.

The customer profiler tool 600 can be used with or without an aftermarket telematics device 214 already installed in the vehicle 218. If the customer 106 already has an aftermarket telematics device 214 installed, after the customer 106 selected a particular telematics application 250 recommended by the customer profiler tool 600, the server 202 will deliver the particular telematics application 250 to the aftermarket telematics device 214. If the customer 106 does not have an aftermarket telematics device 214 already installed in the vehicle 218, then the customer 106 first selects the proposed telematics feature that they are interested in purchasing. The first customer user interface 204 will then provide a list of local retailers 104 from which the customer 106 can select to purchase the aftermarket telematics device 214. The customers' profile, information, and selection will also be sent to server 202 and be pushed to local retailers 104 for the retailers 104 to follow up with the customer 106.

Referring back to FIG. 6, besides the customer profiler tool 600, customers 106 or retailers 104 may choose different telematics applications 250 using compatible products 602 or special offers 604. Compatible products 602 sort different telematics applications 250 that the aftermarket telematics device 214 can use by categories. Customers 106 may opt to search by main categories such as remote start, security, telematics, or audio. Once a category is selected, the user may enter vehicle make, model, and year to view compatible telematics solutions. Customers 106 can also select the product of interest and build a solution by selecting the desired control options and features. Once a system is built, the first customer user interface 204 will display a demonstration on how the system will work through a virtual reality tour by displaying the vehicle image along with a control option image. The customers 106 can then navigate through the demonstration to decide whether it is the telematics solution that they want. If a desired system is built, the customers' profile, information, and selection will be sent to server 202 and be pushed to local retailers 104 for the retailers 104 to follow up with the customers 106.

Another option shown in FIG. 6 is the special offers 604. It recommends telematics applications 250 that are currently in promotion to the customers 104 or retailers 104. In one embodiment, the first customer user interface 204 will recommend only applications that are compatible with the vehicle 218 based on the vehicle information configured in the steps shown in FIGS. 4 and 5.

Figure 9:
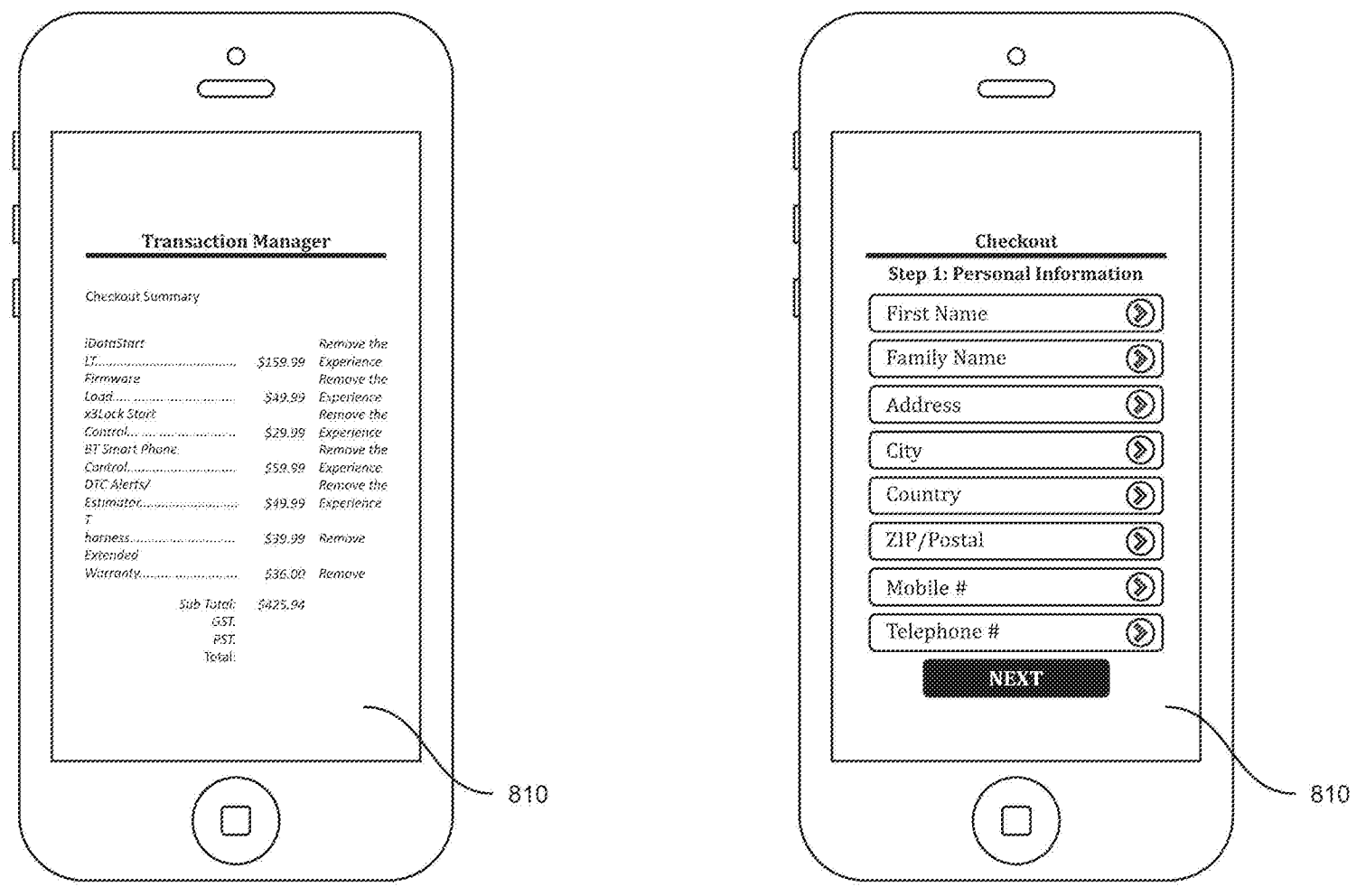

The first customer user interface 204 provides an in-application purchase feature. Once customers 106 have decided to purchase a particular telematics application 250, the first customer user interface 204 will display a transaction manager 810 for customers 106 to complete the transaction, as shown in FIG. 9. The transaction manager 810 displays the price and other check-out information for the customers and will prompt a series of fillable forms for customers 109 to input their payment information such as their credit card information. Once payment is confirmed, an installation-pairing key 816 will be provided to the customer 109 for the installation of the particular telematics application 250 into the aftermarket telematics device 214.

A rental feature is also provided in some embodiments. If a customer 106 is interested in a particular telematics application 250 but he has not yet purchased the application 250, an option to rent the telematics application 250 is available in some scenario. The rental feature will allow the customer 106 to try the application 250 for a limited time without committing to purchasing a permanent license. At the end of the rental period, the particular telematics application 250 will go inactive and the customer 106 may purchase a full license at an additional cost, extend the rental, or continue to use the telematics device 214 using other telematics applications 250 without using the expired trial application. This rental feature is also available for a customer who has purchased an application to share the application with his friend by providing a trial period to the friend.

FIGS. 10 and 11 illustrate a configuration manager 920 that allows the customers 106 to configure the particular telematics applications 250, which are installed in the aftermarket telematics device 214. The configuration manager 920 can be used to configure the particular telematics applications 250 before or after the applications 250 are installed in the aftermarket telematics device 214. The configuration manager 920 provides different preference choices for the customers 106 and also provide authentication among the telematics applications 250, the aftermarket telematics device 214, and the first customer user interface 204, as shown in steps 964 and 965. The configuration manager 920 authenticates the association between the user interface and the telematics device 214 in steps 922 and 924 using the process as discussed above. The configuration manager 920 also allows customers 106 to select installation guides and user owner manuals for their review, as shown in step 966.

In one embodiment of the present invention, a particular telematics application 250 is configured before it is installed in the aftermarket telematics device 214. After it is configured, the data source 200 will transmit the particular telematics application 250 to the first mobile device 206 and causes the first customer user interface 204 to re-transmit the particular telematics application 250 to the aftermarket telematics device 214, as shown in the flashing module at step 967.

In another embodiment, a particular telematics application 250 has been installed in the aftermarket telematics device 214. The customer 106 wants to re-configure the particular telematics application 250 using the configuration manager 920. In one particular scenario, the re-configuration is minor and the first customer user interface 204 will communicate with the aftermarket telematics device 214 to change the preferences in the telematics device 214. In another scenario, the re-configuration is major and the server will transmit another telematics application 250 to the first mobile device 260 and the new telematics application 250 will be installed into the aftermarket telematics device 214 using the flashing module as shown in step 967.

While the previous discussion regarding FIGS. 4-11 focuses on the selection, purchase, delivery, and configuration of telematics applications 250 by the customers 106 using the first customer user interface 204, those skilled in the art would understand that the features shown in FIGS. 4-11 are also accessible to the intermediaries 102 and 104 using their second intermediary user interface 208 and third intermediary user interface 222. As such, the intermediaries 102 and 104 may also select and configure any particular telematics applications 250 for their customers 106 at the point of sale using the features shown in FIGS. 4-11 and using the different ways of delivery of telematics applications 250 as discussed above. This allows intermediaries 102 and 104 to configure the aftermarket telematics device 214 using the same configuration options available to the customers 106.

The intermediaries 102 or 104 may also carry out the user registration and authentication process for the customers 106 through their user interfaces 208 or 222. During this process, the intermediaries 102 or 104 may charge and bill the consumer directly, bypassing the in-application purchase model. In another embodiment, the intermediaries 102 or 104 may also perform an upgrade of the customer's 106 aftermarket telematics device 214 using their user interfaces 208 or 222.

After telematics applications 250 are installed and aftermarket telematics devices 214 are functional, customers 106 may control and configure the aftermarket telematics devices 214 using their first customer user interfaces 204. In some embodiments, a first customer user interface 204 may first pair up with an aftermarket telematics device 214 using wireless technologies such as Bluetooth. In a preferred embodiment, the device pairing is only possible when the vehicle's driver door is open and ignition is turned on for security reasons. The server 202 will authenticate the association of the first customer user interface 204 and the telematics device 214 through unique identifier.

Referring now to FIG. 12, the first customer user interfaces 204 provide in-application control features to allow customers 106 to, for example, adjust the volume and radio channel of their vehicle's radio. Other in-application control features may include searching of points of interest and controlling of a GPS navigation system in the vehicle 218 using the first customer user interface 204. The in-application control provides interactive features for the customers 106 to control their aftermarket telematics device 214. In some embodiments, the development of telematics applications 250 is also open to third party developers 108. This allows different people to invent innovative applications 250 for the aftermarket telematics device 214 that are beyond what the manufacturer 100 originally provides. By simply downloading a new telematics application 250, customer 106 can easily upgrade their aftermarket telematics device 214 via in-application purchase through the first customer user interface 204 without having to go back to a retailer to perform an under-dash hardware upgrade. Even if a hardware upgrade is required, it can be achieved by purchase an add-on hardware as discussed above.

The control of the aftermarket telematics device 214 using the first customer user interface 204 provides different interactive features for the customers 106. One embodiment provides a multiple-user feature. A customer 106 has the option to create additional users under his or her account and assigns access rights to restrict access to certain features. For example, different accounts can be created in a parent-child hierarchy. A parent account is able to create and delete additional users and restrict features such as engine runtime and security features when the vehicle is being operated by a smartphone under a child account. Additionally, the parent account is capable of granting and restricting child-account users to access only or start only specific vehicles on the account assigned to the child accounts.

Another embodiment provides a car-share feature. The car-share feature allows a customer 106 to assign trusted keys and set temporary parameters such as limitations and alerts for a user-programmed period of time or until such keys are cancelled by the customer 106. With the car-share feature turned on, the owner of the vehicle 218 can set up a temporary authorized user that is authorized to drive the car. The owner sets up a car share profile with an email address of the temporary driver. The temporary driver will then use the email address and a specifically generated identifier, such as a password, to login to his or her own first customer user interface 204 and unlock the vehicle 218. When the temporary driver unlocks the vehicle 218, the owner of the vehicle 218 can configure the vehicle 218 without the need of a physically registered key being present in the vehicle.

In yet another embodiment, the first customer user interface 204 provides a keyless feature. This is a feature that is compatible with vehicles that are equipped with push-to-start ignition systems. This feature allows customers 106 to start the engine of the vehicle 218 without requiring the OEM keyless entry fob present in the car. When the customer 106 carries a mobile device 206 with the first customer user interface 204 installed, the first customer user interface 204 will pair with the telematics device 214 and authenticate the ownership of the vehicle 218. This feature essentially replaces the necessity of having to carry a keyless entry fob. When the customer 106 leaves the immediate proximity of the vehicle 218, the aftermarket telematics device 214 will shut the engine off and lock the doors automatically. For valet parting, the customer 106 may gain access of the vehicle 218 to the valet parking personnel using the car-share feature as discussed above.

In yet another embodiment, the aftermarket telematics device 214 monitors the vehicle's diagnostic information such as the engine and transmission conditions. The first customer user interface 204 will be able to recommend a preferred service center in the customers' area based on the customers' preferences and the diagnostic information. The first customer user interface 204 will be able to generate an email that will send useful information about the vehicle 218 to the service center.

Figure 13:
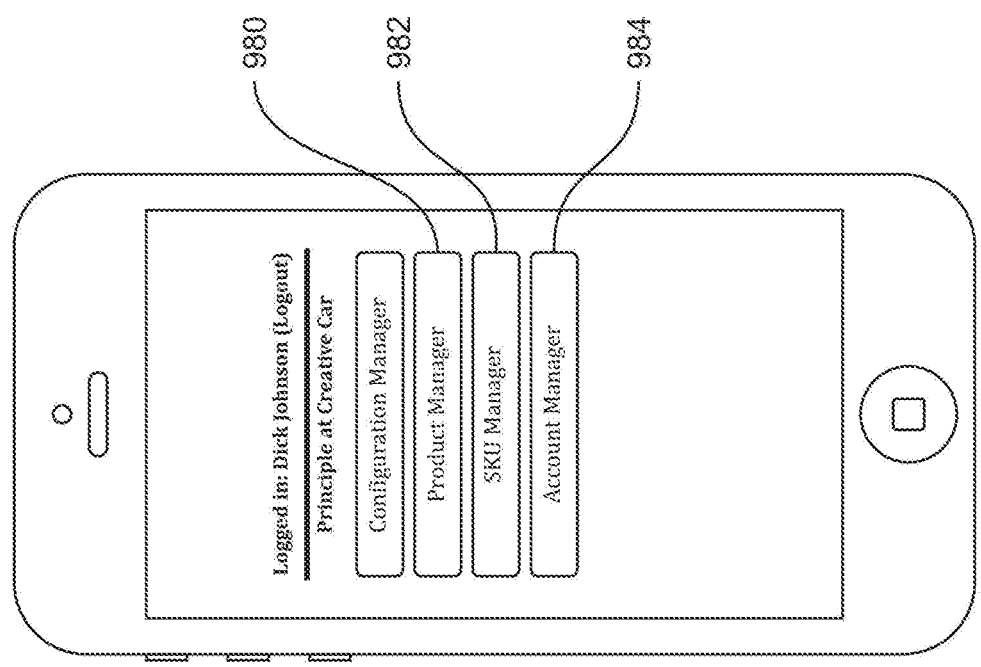
FIG. 13 is an illustrative view of some example views of an user interface in accordance with some embodiments of the present invention.

FIG. 13 illustrates the intermediary user interface 208 and 222 features that are available for the intermediaries 102 and 104. The intermediary user interfaces 208 and 222 provide features such as Product Manager 980, SKU Manager 982, and Account Manager 984 for intermediaries 102 and 104 to manage their inventory and transaction records. These features ensure that all revenue from the in-application purchases of the customers are allocated properly among the intermediaries. Using the third intermediary user interface 222, the third intermediary 102, for example, a distributor, may use the Account Manager 984 to add or remove second intermediaries 104, such as retailers. When a second intermediary 104 makes sales of an aftermarket telematics device 214 to a customer 106, a transaction record that is associated with the particular aftermarket telematics device 214, the customer 106, the retailer 104, and the distributor 102 will be generated. As such, the server 202, the retailer 104 and the distributor 102 will have a record of the purchase. If the customer 106 performs an in-application purchase, a transaction record that is associated with the retailer 104 and the distributor 102 will be generated. As such, the retailer 104 and the distributor 102 may receive a share of the revenue based on this in-application purchase. Likewise, if the customer 106 purchases an add-on component 220 and download a telematics application 250 for the add-on component 220, a similar transaction record that is associated with the retailer 104 and the distributor 102 will also be generated.

Those of skill would further appreciate that the various illustrative logical blocks, configurations, modules, and algorithm steps described in connection with the embodiments disclosed herein may be implemented as electronic hardware, computer software, or combinations of both. To clearly illustrate this interchangeability of hardware and software, various illustrative components, blocks, configurations, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The foregoing description of the embodiments of the present invention has been presented for the purpose of illustration and description. It is not intended to be exhaustive or to limit the invention to the precise form disclosed. Many modifications and variations are possible in light of the above teachings. The numerical values described in the description are only for illustration purpose and should not be understood as limiting the invention to the precise numbers. It is intended that the scope of the present invention not be limited by this detailed description, but by the claims and the equivalents to the claims appended hereto.

I claim:

1. A telematics device system for vehicles, comprising:
an aftermarket telematics device adapted to be installed in a vehicle, said aftermarket telematics device compatible with a plurality of telematics applications;
a first user interface installed on a mobile device adapted to communicate with said aftermarket telematic device, said first user interface configurable to be associated with said aftermarket telematics device through a first authentication process;
a second user interface adapted to communicate with said aftermarket telematic device, said second user interface configurable to be associated with said aftermarket telematics device through a second authentication process;
a data source adapted to store said plurality of telematics applications, communicate with said first and second user interfaces, and authenticate said first and second authentication processes;
wherein said data source is adapted to receive user information regarding said aftermarket telematics device from said first user interface including a first-user-requested update for said aftermarket telematics device, said first-user-requested update may be new applications from said plurality of telematics applications;
said second user interface is adapted to receive said user information from said data source;

said second intermediary user interface is capable of adapted to select a second-user-accepted update from said plurality of telematics applications for said aftermarket telematics device and instruct said data source to transmit said second-user-accepted update to said first user interface on said mobile device; and, said first user interface is adapted to receive said second-user-accepted update and to control and configure said aftermarket telematics device with said second-user-accepted update via said short-ranged protocol after said first and second authentication processes.

2. The telematics device system of claim 1, wherein said aftermarket telematics device can be adapted to different telematics application features.

3. The telematics device system of claim 1, wherein said first user interface is adapted to collect information from a user and, based on the information collected, said first user interface is adapted to generate a profile that recommend telematics applications to said user.

4. The telematics device system of claim 1, wherein said first user interface is adapted to communicate with a third party data source that is associated with a developer application program interface that allows developers to develop telematics applications that are compatible with said aftermarket telematics device.

5. The telematics device system of claim 1, wherein said first user interface is adapted to cause said mobile device to transmit said particular telematics application to said aftermarket telematics device via said short-ranged protocol when said mobile device is in a proximity to said aftermarket telematics device.

6. The telematics device system of claim 1, wherein said authentication process that associates said first user interface with said aftermarket telematics device can only be initiated when said aftermarket telematics device has detected that a door of said vehicle is open and an ignition of said vehicle is turned on.

7. The telematics device system of claim 1, wherein said first user interface is used by an intermediary, after said particular telematics application is delivered, said first user interface is adapted to generate a transaction record that is associated with the intermediary.

* * * * *